United States Patent
Li

(10) Patent No.: US 9,375,849 B2
(45) Date of Patent: Jun. 28, 2016

(54) SUCKER

(71) Applicant: GISON MACHINERY CO., LTD., Taichung (TW)

(72) Inventor: Kuang-Tai Li, Taichung (TW)

(73) Assignee: GISON MACHINERY CO., LTD., Taichung (TW)

( * ) Notice: Subject to any disclaimer, the term of this patent is extended or adjusted under 35 U.S.C. 154(b) by 0 days.

(21) Appl. No.: 14/522,692

(22) Filed: Oct. 24, 2014

(65) Prior Publication Data

US 2016/0031092 A1   Feb. 4, 2016

(30) Foreign Application Priority Data

Jul. 31, 2014  (TW) .............................. 103126260 A

(51) Int. Cl.
| | |
|---|---|
| *B25J 15/06* | (2006.01) |
| *B66C 1/02* | (2006.01) |
| *B65G 47/91* | (2006.01) |
| *B25B 11/00* | (2006.01) |

(52) U.S. Cl.
CPC ........... *B25J 15/0683* (2013.01); *B25B 11/007* (2013.01); *B25J 15/0625* (2013.01); *B65G 47/91* (2013.01); *B66C 1/02* (2013.01)

(58) Field of Classification Search
CPC ............... B25J 15/0683; B25J 15/0625; B25J 15/0616; B25J 15/0633
USPC .......... 294/183, 186, 187; 901/40; 248/205.5, 248/206.2, 206.3
See application file for complete search history.

(56) References Cited

U.S. PATENT DOCUMENTS

| | | | | | |
|---|---|---|---|---|---|
| 1,400,573 | A | * | 12/1921 | Stader .................... | B21D 43/18 248/205.9 |
| 2,871,054 | A | * | 1/1959 | Zinke ...................... | B21D 1/06 294/187 |
| 4,708,381 | A | * | 11/1987 | Lundback .............. | B65G 47/91 248/362 |
| 4,858,976 | A | * | 8/1989 | Stoll ..................... | B25B 11/007 294/186 |
| 6,213,528 | B1 | * | 4/2001 | Hufken ................ | B65G 47/917 294/186 |
| 6,264,259 | B1 | * | 7/2001 | Fortune ................ | B25B 11/007 294/186 |
| 7,690,869 | B2 | * | 4/2010 | Yo ........................ | B65G 49/061 269/20 |
| 8,500,181 | B2 | * | 8/2013 | Ostendarp .............. | B65G 47/91 294/187 |
| 2002/0113181 | A1 | * | 8/2002 | Zou ........................ | F16B 47/00 248/205.5 |
| 2010/0252700 | A1 | * | 10/2010 | Wang ...................... | F16B 47/00 248/206.2 |
| 2012/0256433 | A1 | * | 10/2012 | Fukano ................ | B25B 11/007 294/183 |
| 2013/0026775 | A1 | * | 1/2013 | Sydorko ............... | B25B 11/007 294/183 |
| 2014/0241846 | A1 | * | 8/2014 | Mohd Zairi .......... | B25J 15/0683 414/752.1 |

* cited by examiner

*Primary Examiner* — Gabriela Puig
(74) *Attorney, Agent, or Firm* — Guice Patents PLLC

(57) ABSTRACT

A sucker includes: a main body having a bottom face formed with an annular abutment; a disc body made of a flexible material having a tapered annular wall, the disc body being disposed under the bottom face of the main body, an outer circumference of the annular wall being formed with a freely flexible lip edge positioned below the annular abutment face; an air chamber being formed in the disc body; and an air-sucking passage having a first end in communication with the air chamber of the disc body and a second end passing through the disc body and the main body to communicate with outer side. When the sucker sucks a surface of an object, the top face of the lip edge is in contact with the abutment face and supported thereby.

14 Claims, 11 Drawing Sheets

SUCKER

BACKGROUND OF THE INVENTION

1. Field of the Invention

The present invention relates generally to a device for providing sucking force, and more particularly to a sucker structure.

2. Description of the Related Art

A conventional sucker is able to provide sucking force to suck and fix an object. The conventional suckers can be substantially classified into two types. One is the sucker connected to a power source (such as a sucking device). The other is the sucker free from any power source. The sucker operates in a principle that the air pressure in the sucker is smaller than the atmospheric pressure so as to create sucking force.

No matter which type the sucker pertains to, the conventional sucker can be only applied to a polished surface such as glass. In the case that the sucker is applied to a non-polished surface, the internal air chamber of the sucker will communicate with the outer side to loss the sucking effect. Therefore, it is always an important topic in this field how to maintain the sucking force of the sucker and enhance the load capability of the sucker.

SUMMARY OF THE INVENTION

It is therefore a primary object of the present invention to provide a sucker structure, which has higher sucking effect.

It is a further object of the present invention to provide the above sucker structure, which can be used in cooperation with a power source. The sucker structure is applicable to a non-polished surface.

The sucker of the present invention includes: a main body, a bottom face of the main body being formed with an annular abutment face; a disc body made of a flexible material, the disc body being disposed under the bottom face of the main body, the disc body having a tapered annular wall formed around the disc body, an outer circumference of the annular wall being outward downward inclined to form a lip edge, which is freely flexible, an air chamber being formed in the disc body and defined by the annular wall of the disc body; and an air-sucking passage having a first end and a second end. The first end of the air-sucking passage communicates with the air chamber of the disc body. The second end of the air-sucking passage passes through the disc body and the main body to communicate with outer side.

Thanks to the flexibility of the lip edge, when the sucker sucks a surface of an object, the lip edge contacts the surface by a relatively gentle angle, whereby the contact area between the disc body and the object is larger to achieve a better sucking effect. The air in the air chamber is prevented from escaping from the disc body.

The sucker of the present invention is applicable to a non-polished surface such as the rough surface of a wooden board, a brick and a wall.

The sucker of the present invention has excellent sucking effect and higher load capability.

The present invention can be best understood through the following description and accompanying drawings, wherein:

DETAILED DESCRIPTION OF THE PREFERRED EMBODIMENTS

Figure 1:
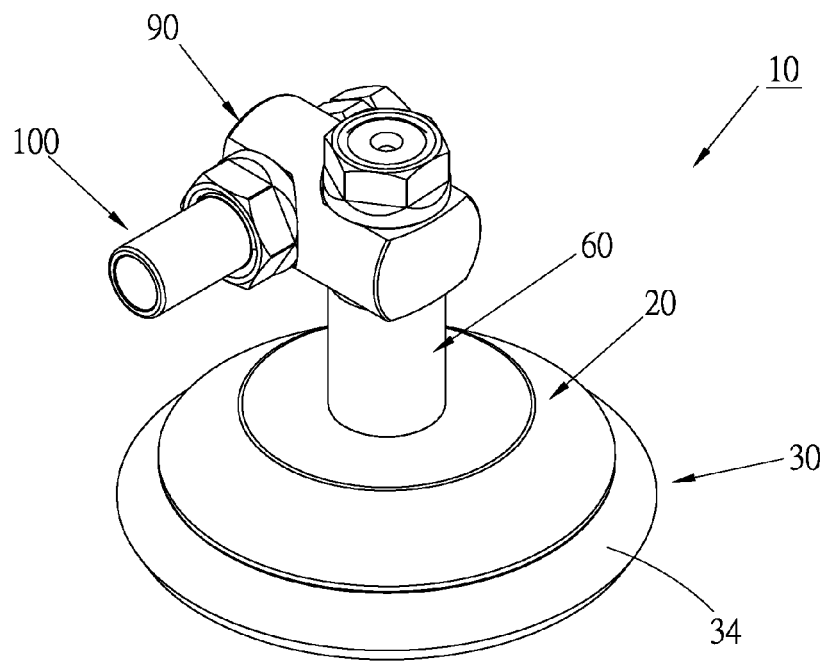
FIG. 1 is a perspective view of a first embodiment of the sucker of the present invention.
Figure 2:
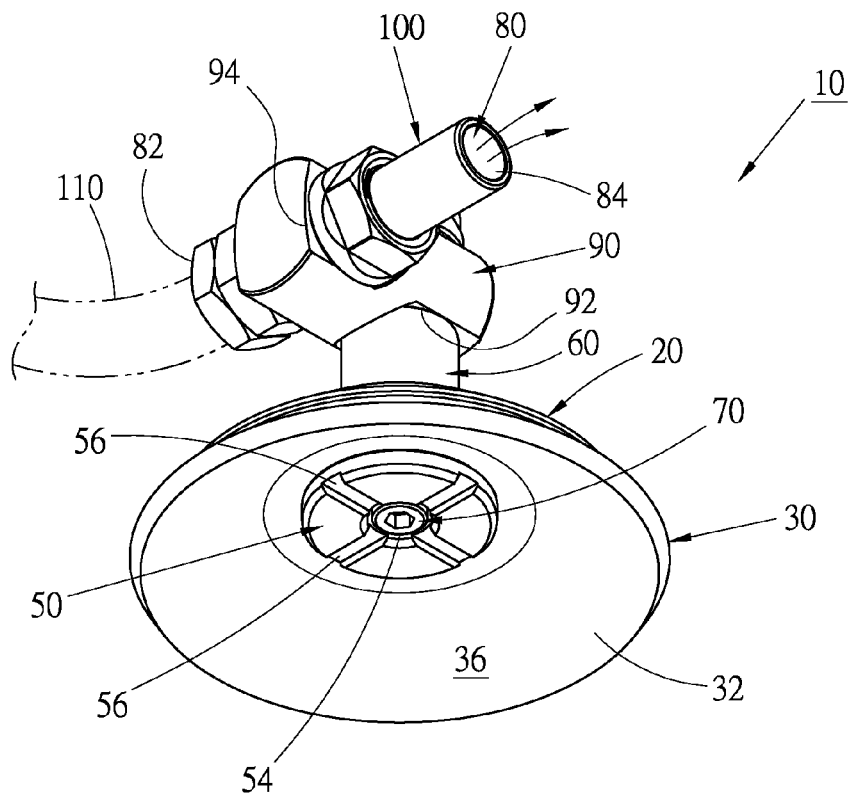
FIG. 2 is a bottom perspective view according to FIG. 1.
Figure 3:
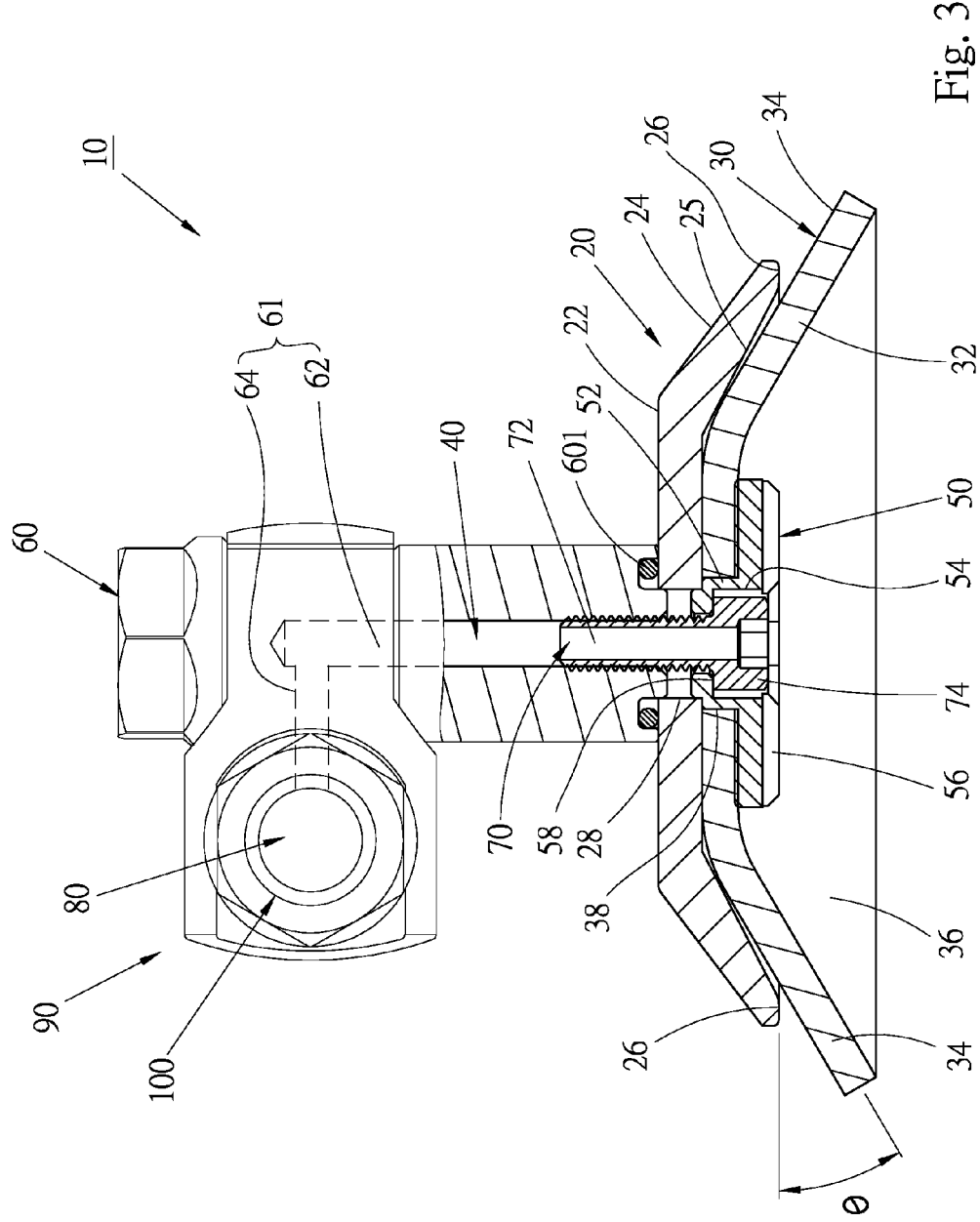
FIG. 3 is a partially longitudinal sectional view taken along line 3-3 of FIG. 1.
Figure 4:
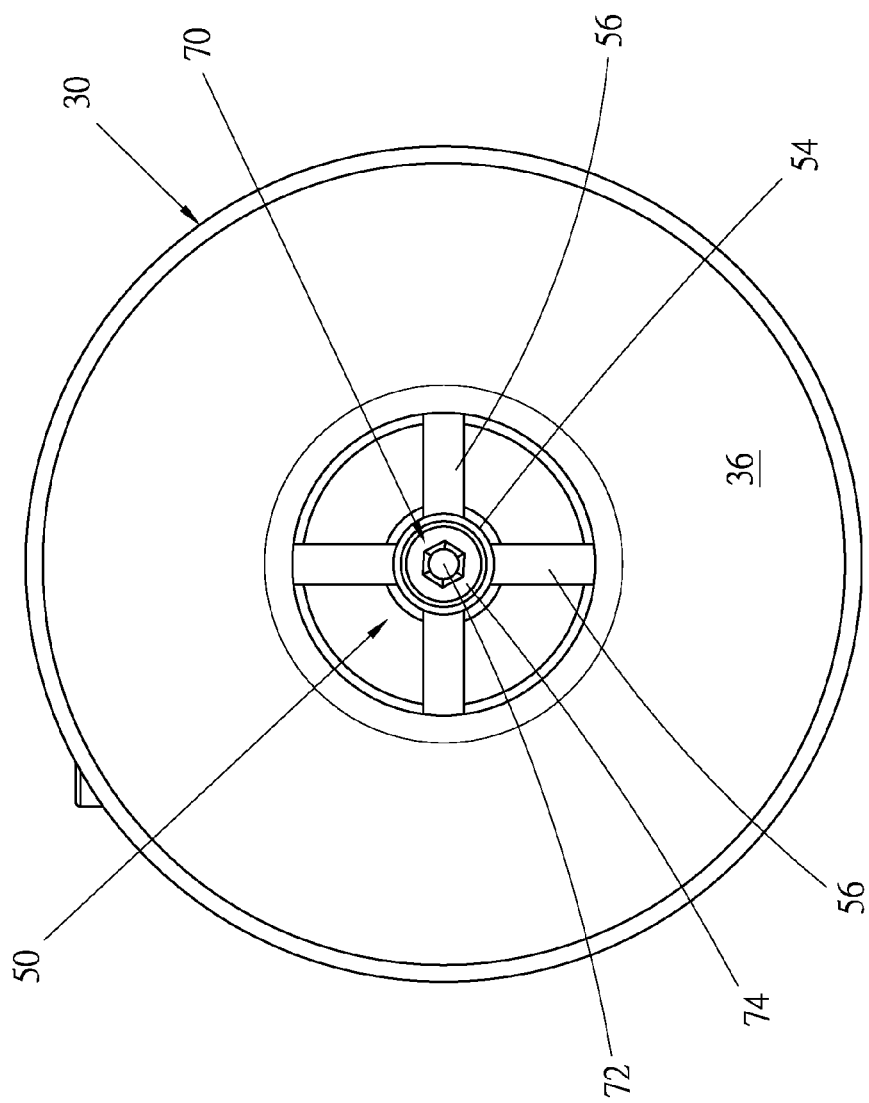
FIG. 4 is a bottom view according to FIG. 1.

Please refer to FIGS. 1 to 3. According to a first embodiment, the sucker 10 of the present invention includes a main body 20, a soft disc body 30 and an air-sucking passage 40.

The main body 20 has the form of a circular disc and is made of hard material. The main body 20 has a plane inner disc section 22 and an outer disc section 24 connected with outer circumference of the inner disc section 22. The bottom face of the outer disc section is a conic face downward inclined and outward extending from the inner disc section 22. The conic bottom face of the main body defines a concaved tapered or conic room 25. The bottom face of the main body 20 is further provided with an annular abutment face 26 connected with outer periphery of the room 25. Preferably, the annular abutment face 26 is a plane face. In practice, alternatively, the annular abutment face 26 also can be an inclined face. In this embodiment, the abutment face 26 is a horizontal plane face.

The disc body 30 is made of a flexible material with sealing effect, such as rubber. The disc body 30 is mounted in the room 25 of the bottom face of the main body 20. The disc body 30 has a conic annular wall 32 formed around the disc body 30. An outer circumference of the annular wall 32 downward extends out of the room of the main body 20. A section of the annular wall 32 that protrudes from the room 25 forms a lip edge 34 positioned below the abutment face 26 without attaching to or contacting the abutment face 26. Therefore, the lip edge 34 is freely flexible. An air chamber 36 is formed in the disc body 30 as an inward recessed space defined by the annular wall 32. Please refer to FIG. 3. The lip edge 34 of the annular wall 32 is outward downward inclined. An angle θ contained between the lip edge 34 and the abutment face 26 is smaller than 45 degrees. For example, the angle θ ranges from 20 degrees to 35 degrees, and preferably ranges from 25 degrees to 35 degrees. Preferably, the angle θ is 30 degrees.

The air-sucking passage 40 passes through the center of the main body 20 and the center of the disc body 30. A first end (a bottom end) of the air-sucking passage 40 communicates with the air chamber 36 of the disc body 30. A second end (a top end) of the air-sucking passage 40 passes through the disc body and the room of the main body to communicate with outer side. The air in the air chamber 36 can flow through the air-sucking passage 40.

The sucker 10 further includes a disc-shaped retainer member 50. A protrusion section 52 upward extends from the center of the top face of the retainer member 50. The retainer member is formed with an internal hole 54. The retainer member 50 is disposed under the disc body 30. The protrusion section 52 extends into a perforation 38 formed at the center of the disc body 30. In practice, the protrusion section 52 is connected with the main body 20, whereby the disc body 30 is fixedly clamped between the main body 20 and the retainer member 50. The hole 54 of the retainer member 50 communicates with the air chamber 36. In the case that the sucker 10 is simply composed of the main body, the disc body and the retainer member, the air-sucking passage 40 is formed of the passage 28 of the main body 20 and the hole 54 of the retainer member or simply formed of the hole 54. As shown in FIGS. 2 and 3, at least one channel 56 is radially formed on the bottom face of the retainer member 50 in communication with the hole 54 of the retainer member 50 and further in communication with the first end of the air-sucking passage 40.

Please refer to FIG. 3. In this embodiment, the sucker further includes a cylindrical support 60 disposed on the top face of the main body 20. An airflow passage 61 is formed in the support 60. In this embodiment, the airflow passage 61 includes a longitudinal branch passage 62 and at least one radial branch passage 64. The longitudinal branch passage 62 extends in a longitudinal direction of the support. One end of the longitudinal branch passage 62 is positioned at the bottom end of the support. The radial branch passage 64 extends in a radial direction of the support 60 in communication with the longitudinal branch passage 62. A hollow connection rod 70 has a passageway 72 passing through the connection rod 70 between two ends thereof. The connection rod 70 extends in an axial direction of the disc body 30 to pass through the disc body 30 and the main body 20. Two ends of the connection rod 70 are respectively connected with the bottom end of the support 60 and the retainer member 50. The support 60, the main body 20, the disc body 30 and the retainer member 60 are connected with each other to together form a sandwich connection structure. Two ends of the passageway 72 of the connection rod 70 respectively communicate with the air chamber 36 and the longitudinal branch passage 62. In this structure, the air-sucking passage 40 is formed of the passageway 72 of the connection rod 70 and the airflow passage 61 of the support 60. In this embodiment, the connection rod 70 is a hollow threaded member, which has a large-diameter head section 74 received in the hole 54 of the retainer member 50 in abutment with a shoulder section 58 of the retainer member. The other end of the connection rod 70 is screwed with a wall of the longitudinal branch passage 62. An airtight member (O-ring) 601 is disposed between the bottom end of the support 60 and the main body 20 to achieve an airtight effect.

According to the above structure, a structure (not shown) capable of generating a sucking force is connected with the airflow passage 61 of the support 60 to provide sucking force for the air chamber 36.

Please refer to FIGS. 2 and 3. In this embodiment, the sucker 10 further has a fast flow way (air flow channel) 80 for fast airflow to flow through. The fast flow way 80 is independent from the air-sucking passage 40. The fast flow way 80 has an air inlet end 82 and an air outlet 84. A nozzle (not shown) is disposed in the fast flow way 80. The second end of the air-sucking passage 40, (that is, the second end of the airflow passage 61) communicates between the air inlet end and air outlet end of the fast flow way 80. In practice, the fast flow way 80 can be directly disposed on the support 60 in communication with the air-sucking passage 40.

Substantially, the first embodiment of the present invention further includes a bridge member 90 and a connection valve 100. The support 60 passes through a first installation hole 92 of the bridge member. The connection valve 100 has a cylindrical shape and is installed in a second installation hole 94 of the bridge member 90. The fast flow way 80 is disposed in the connection valve 100. The air inlet end 82 and the air outlet end 84 of the fast flow way 80 are respectively positioned at two ends of the connection valve 100. The radial branch passage 64 of the airflow passage 61 passes through the bridge member 90 to communicate with the fast flow way 80, whereby the fast flow way communicates with the air-sucking passage.

The use of the present invention is described hereinafter. According to Bernoulli's principle that an increase in the speed of the fluid occurs simultaneously with a decrease in pressure, the sucker of the present invention generates a sucking force. In this embodiment, a high-pressure air pipeline 110 is connected to the connection valve 100 as shown in FIG. 2. The high-pressure air enters the fast flow way 80 through the air inlet end 82 of the fast flow way 80 and flows out of the fast flow way 80 from the air outlet end 84 thereof. After the high-pressure air flows into the fast flow way 80, the high-pressure air forms a fast airflow, which quickly flows through the fast flow way 80 due to the internal structure thereof. Therefore, the air in the fast flow way 80 has a high speed and low pressure. Relative to the fast flow way 80, the air in the air chamber 36 and the air-sucking passage 40 has a slow speed and high pressure. Under the effect of pressure difference, the air in the air chamber 36 and the air-sucking passage 40 will flow toward the fast flow way 80. As a result, a negative pressure (lower than atmospheric pressure) is created in the air-sucking passage 40 and the air chamber 36 so that the sucker 10 generates a sucking force to make the disc body 30 suck a surface 115 of an object as shown in FIG. 5.

Figure 5:
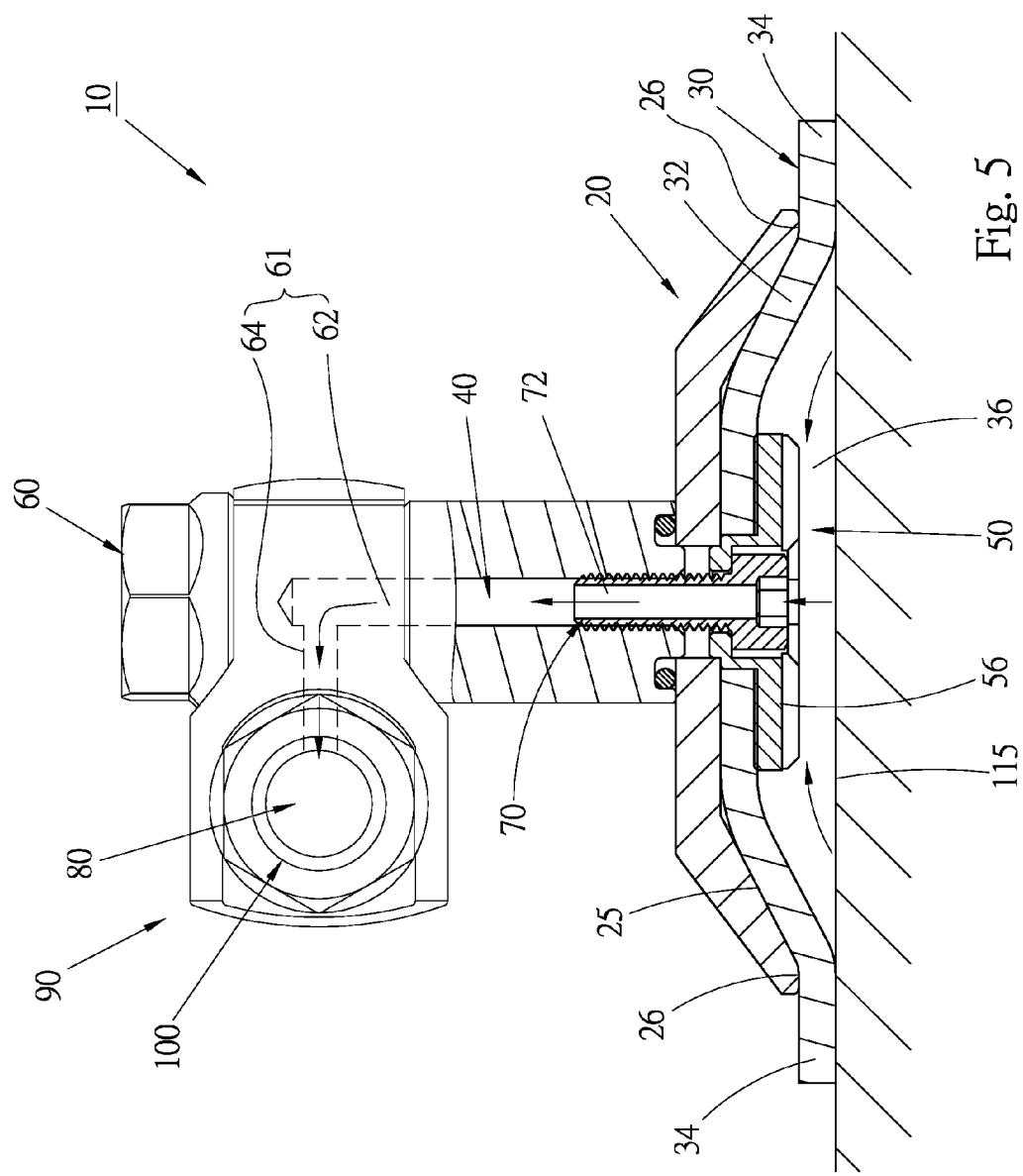
FIG. 5 is a sectional view of the first embodiment of the sucker of the present invention, showing the use thereof.

With the direction of FIG. 5 serving as a reference, when the sucker 10 generates a sucking force, the lip edge 34 of the disc body snugly attaches to the surface 115 of the object. Therefore, the entire sucker 10 is moved to get closer to the surface. Under the sucking force, the lip edge 34 of the disc body 30 is flexed from an inclined state to a horizontal state. The top face of the lip edge 34 is snugly attached to the annular abutment face 26 of the main body 20, while the bottom face of the lip edge 34 is snugly attached to the surface 115, whereby the air chamber 36 becomes a closed space isolated from outer side. The air in the air chamber 36 is sucked to the passageway 72 of the connection rod 70. The channel 56 of the retainer member 50 serves as an air guide channel to uniformly guide the air in the air chamber into the passageway 72 and enhance the flowing efficiency. The air further flows from the passageway 72 into the airflow passage 61 to be sucked into the fast flow way 80. The air is then exhausted from the air outlet end 84 along with the fast airflow.

When the sucker 10 sucks a surface 115, due to the sucking force, the air chamber 36 forms a negative pressure space in which the air pressure is smaller than the atmospheric pressure. The high-speed airflow continuously flows through the fast flow way 80 so that the sucking force of the sucker can be maintained to keep the air chamber 36 in a negative pressure state.

The annular wall 32 of the disc body 30 of the present invention has a movable lip edge 34 free to flex. When the sucker 10 sucks the surface 115 of the object, under the negative pressure effect of the air chamber 36, the lip edge 34 is optimally flexed to make the bottom face of the lip edge 34 snugly attach to and contact the surface 115. The top face of the lip edge 34 is in contact with the abutment face 26 and supported by the abutment face 26. Therefore, the soft lip edge 34 is clamped between the abutment face 26 and the surface 115 to achieve a good airtight effect. Accordingly, the sucker of the present invention is able to provide an excellent sucking force. Moreover, thanks to the flexibility of the lip edge 34, the lip edge 34 can contact the surface 115 by a large area. In addition, the soft disc body 30 can more snugly attach to the surface of the object to enhance the airtight effect between the disc body 30 and the surface 115. In this case, the air in the air chamber 36 can hardly escape from the air chamber so that the attachment of the sucker to the surface 115 can be ensured. Also, the capacity of the air chamber 36 is reduced so that the negative pressure space is minified to increase the sucking force.

When the airflow in the fast flow way 80 is stopped or interrupted, the surface is released from the sucking force of the sucker.

In this embodiment, the sucker can provide very good sucking force with a small volume of high-pressure air. It is revealed from the test of the applicant that a sucker with a diameter of about 8 cm can suck an object with a weight over 10 kg. It is proved through the test the sucker of the present invention not only can suck a polished surface, but also can suck a non-polished surface with raised/recessed sections and micro-orifices, such as the surface of a wooden board, a brick, a cement wall or a metal article. Moreover, the sucker also can provide sucking force in the water. Please refer to the attachment, which is a test film of a real sample of the sucker of the present invention applied to different objects. In the film, the sucker of the present invention can suck various objects made of different materials with different weights and different surface properties. The sucker of the present invention is truly able to provide strong sucking force to suck different heavy objects. For example, as shown in the film, the sucker of the present invention can suck concrete block and cylindrical iron block. Also, the objects can be quickly released from the sucking force of the sucker of the present invention. It is proved in the film that the sucker 10 of the present invention can quickly provide sucking force and the airtight effect between the main body, the lip edge 34 and the surface 115 of the object is excellent. Accordingly, the air in the air chamber 36 can be sucked away by a speed higher than the speed by which the air escapes from the non-polished surface of the wooden board or brick. That is, the air in the air chamber can hardly escape through the gaps between the lip edge and the surface of the object in time.

Figure 6:
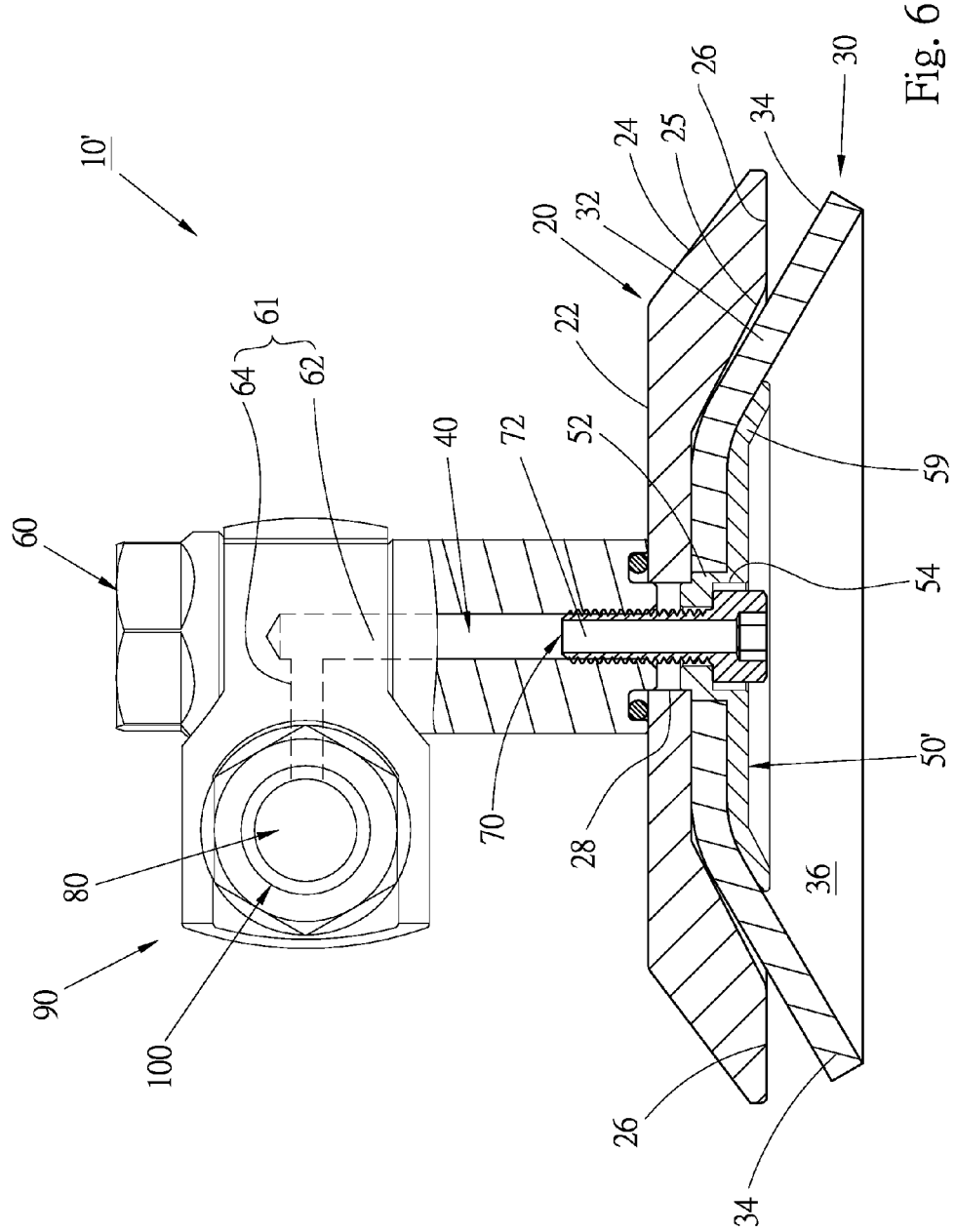
FIG. 6 is a longitudinal sectional view of a second embodiment of the sucker of the present invention.

Please now refer to FIG. 6, which is a longitudinal sectional view of a second embodiment of the sucker 10' of the present invention. The same components are denoted with the same reference numerals and will not repeatedly described hereinafter.

Figure 7:
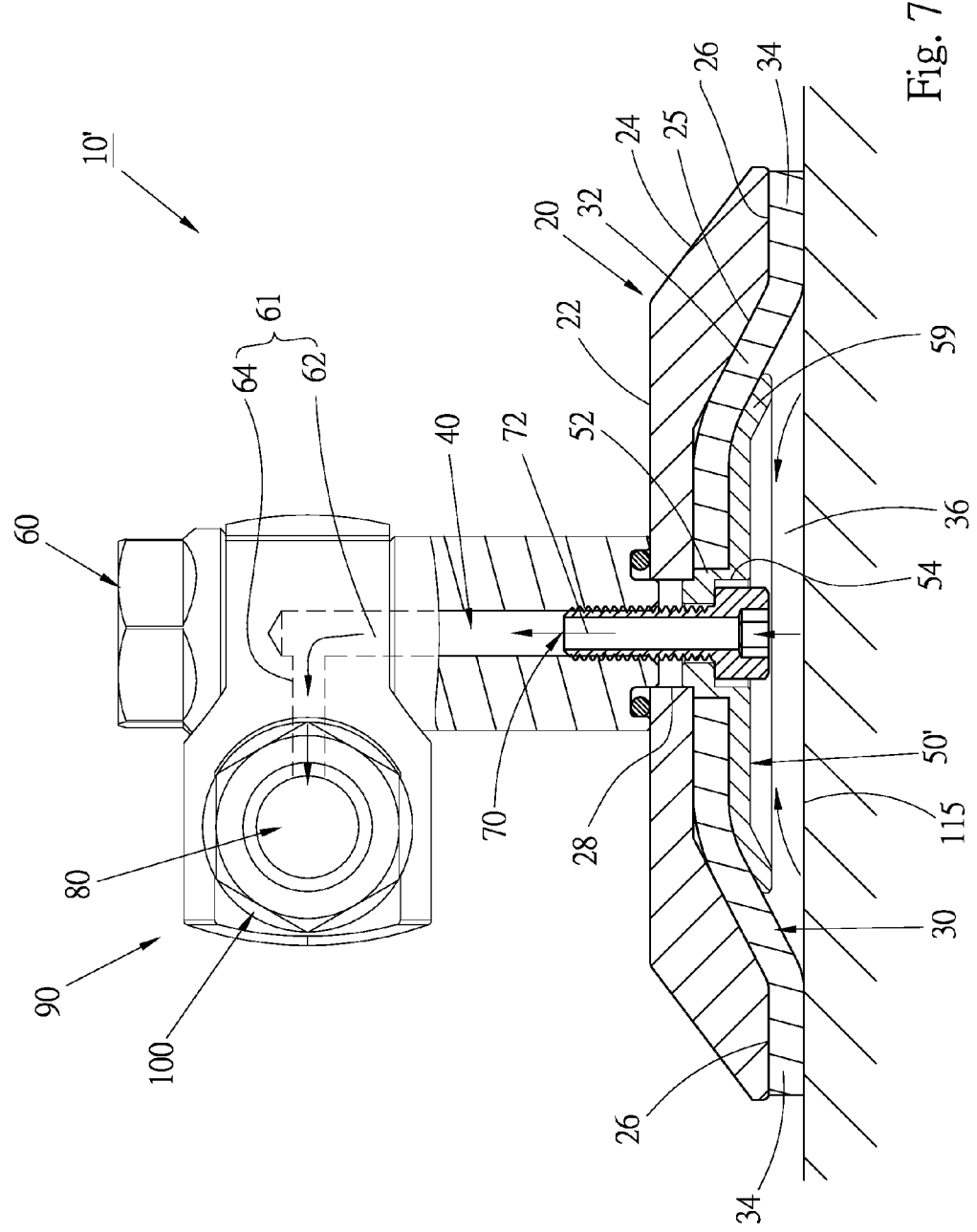
FIG. 7 is a sectional view according to FIG. 6, showing the use of the second embodiment of the sucker of the present invention.

In this embodiment, the outer diameter of the main body 20 is approximately equal to the outer diameter of the disc body 30. The diameter of the annular abutment face 26 is also approximately equal to the diameter of the lip edge 34. Referring to FIG. 7, when the sucker 10' sucks the surface 115 of an object, the entire top face of the lip edge 34 of the disc body 30 is supported by the abutment face 26 so that the airtight effect between the sucker 10' and the surface 115 is further enhanced. In addition, an oblique conic section 59 further outward extends from the outer circumference of the retainer member 50' corresponding to the conic face of the room 25 of the main body 20. In this case, the annular wall 32 of the disc body 30 is more securely held and supported.

Figure 8:
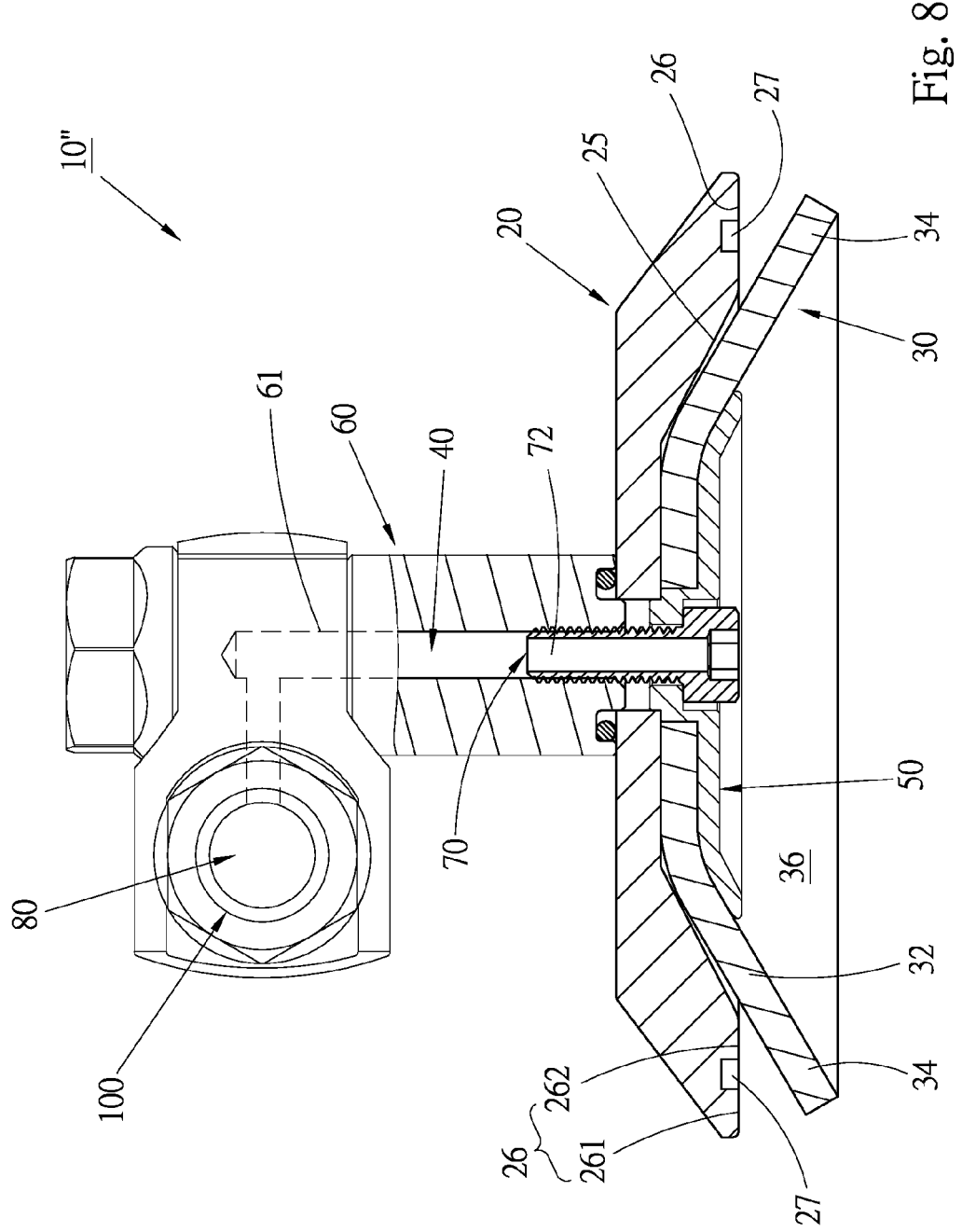
FIG. 8 is a longitudinal sectional view of a third embodiment of the sucker of the present invention.
Figure 9:
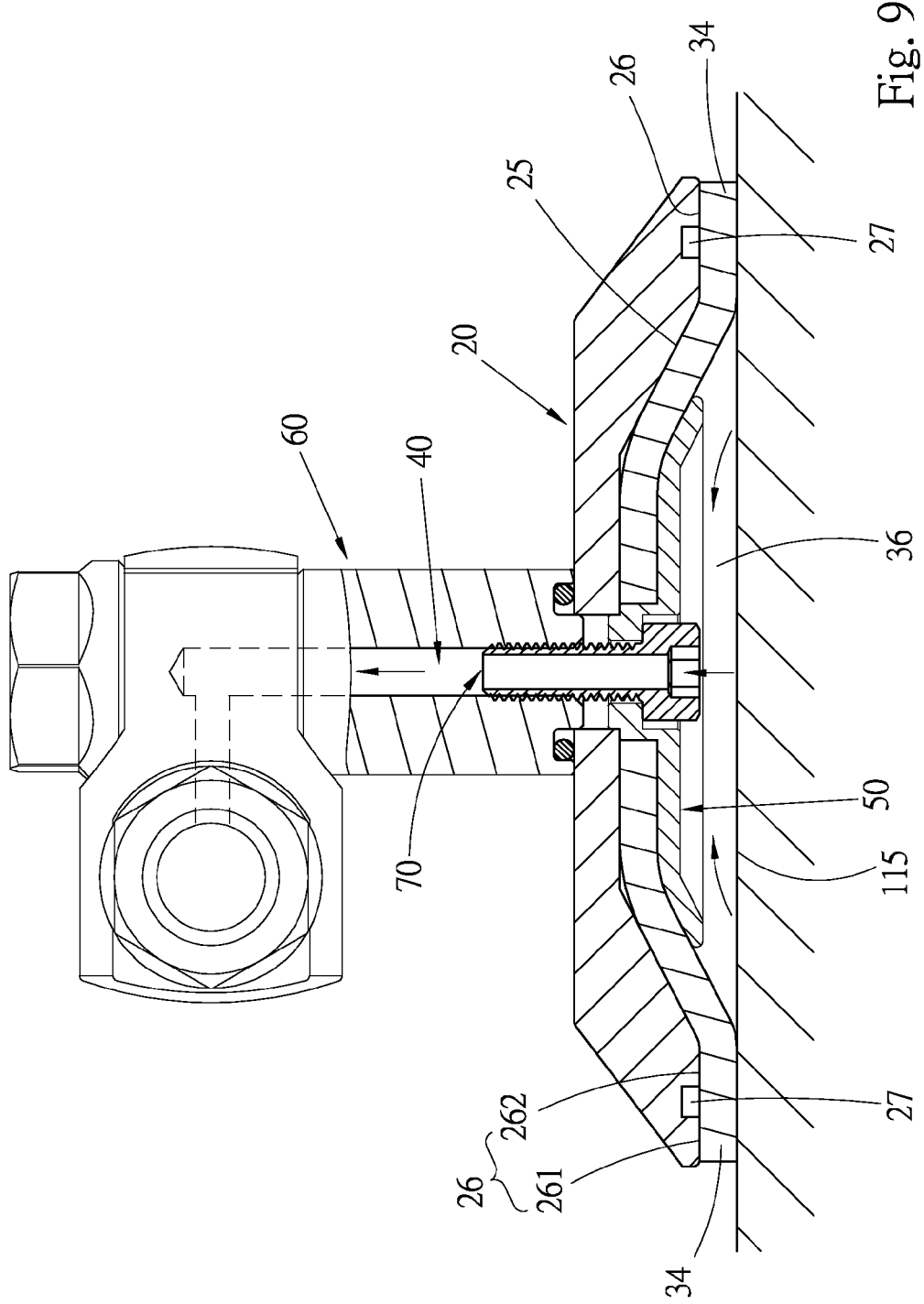
FIG. 9 is a sectional view according to FIG. 8, showing the use of the third embodiment of the sucker of the present invention.

Please now refer to FIGS. 8 and 9. FIG. 8 is a longitudinal sectional view of a third embodiment of the sucker 10" of the present invention. FIG. 9 is a sectional view according to FIG. 8, showing the use of the third embodiment of the sucker 10" of the present invention. The third embodiment is substantially identical to the second embodiment in structure. In this embodiment, the annular abutment face 26 of the main body is further formed with an annular groove 27, whereby the annular abutment face is formed with an inner annular support face 261 and an outer annular support face 262. When the sucker 10" sucks the surface 115 of an object, the top face of the lip edge 34 is supported by the two support faces 261, 262 to achieve double airtight effect. Moreover, the annular groove 27 can receive the non-plane or squeezed section of the lip edge 34, whereby the lip edge can more snugly attach to the surface 115 of the object and the two support faces to enhance the airtight effect and sucking force.

Figure 10:
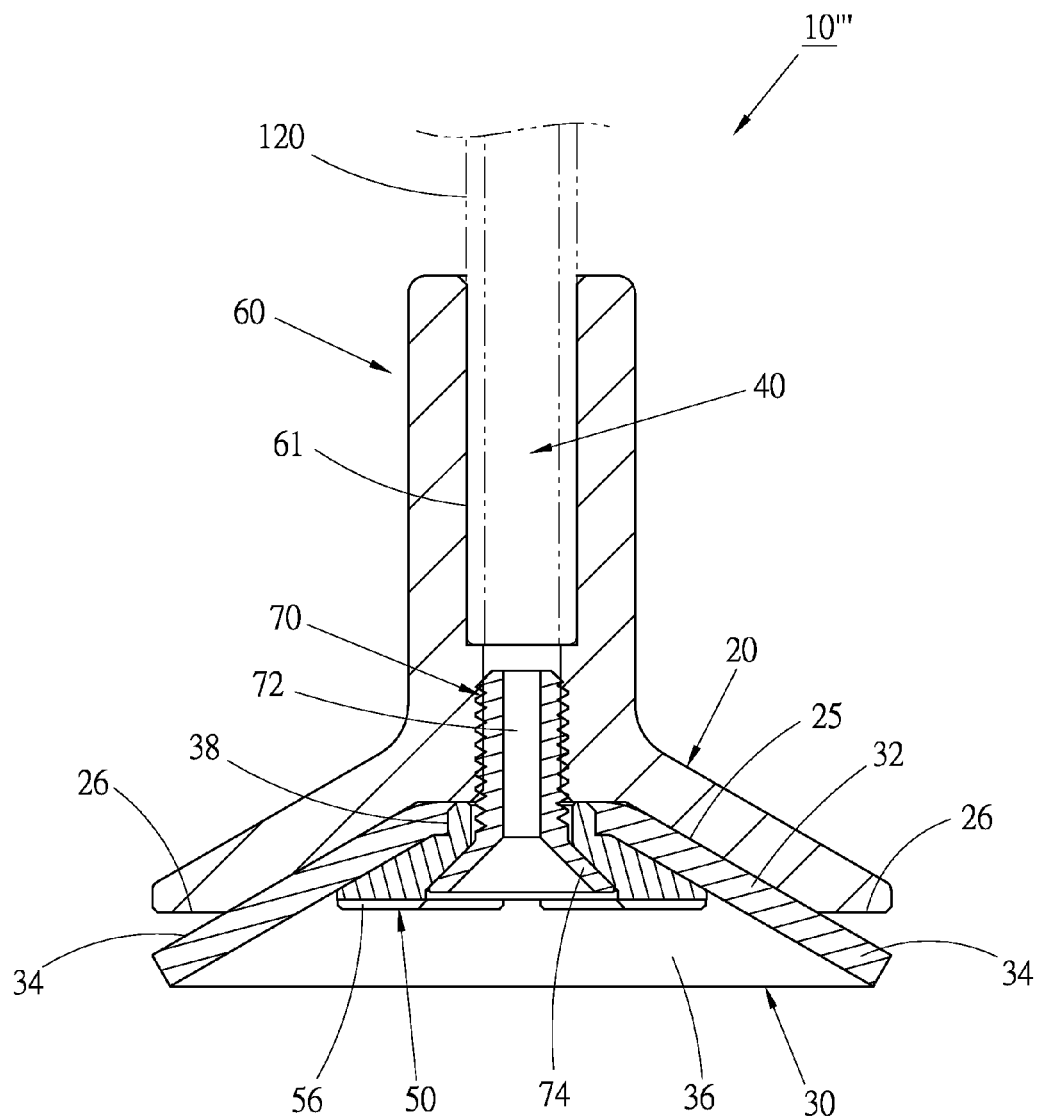
FIG. 10 is a longitudinal sectional view of a fourth embodiment of the sucker of the present invention.

Please now refer to FIG. 10, which is a longitudinal sectional view of a fourth embodiment of the sucker 10''' of the present invention. The same components are denoted with the same reference numerals and will not repeatedly described hereinafter. The fourth embodiment includes a main body 20, a disc body 30, a retainer member 50, a support 60 and a connection rod 70. The support 60 is integrally formed with the main body 20. The support 60 is a straight tubular body and an L-shaped tubular body. The support 60 has an internal airflow passage 61 as a part of the air sucking passage 40. The support 60 of the sucker 10''' is connected to a specific section of a sucking device, such as a tubular body 120 as shown by phantom lines of FIG. 10. It should be noted that the disc body 30 can be directly fixed by the main body and the retainer member.

Figure 11:
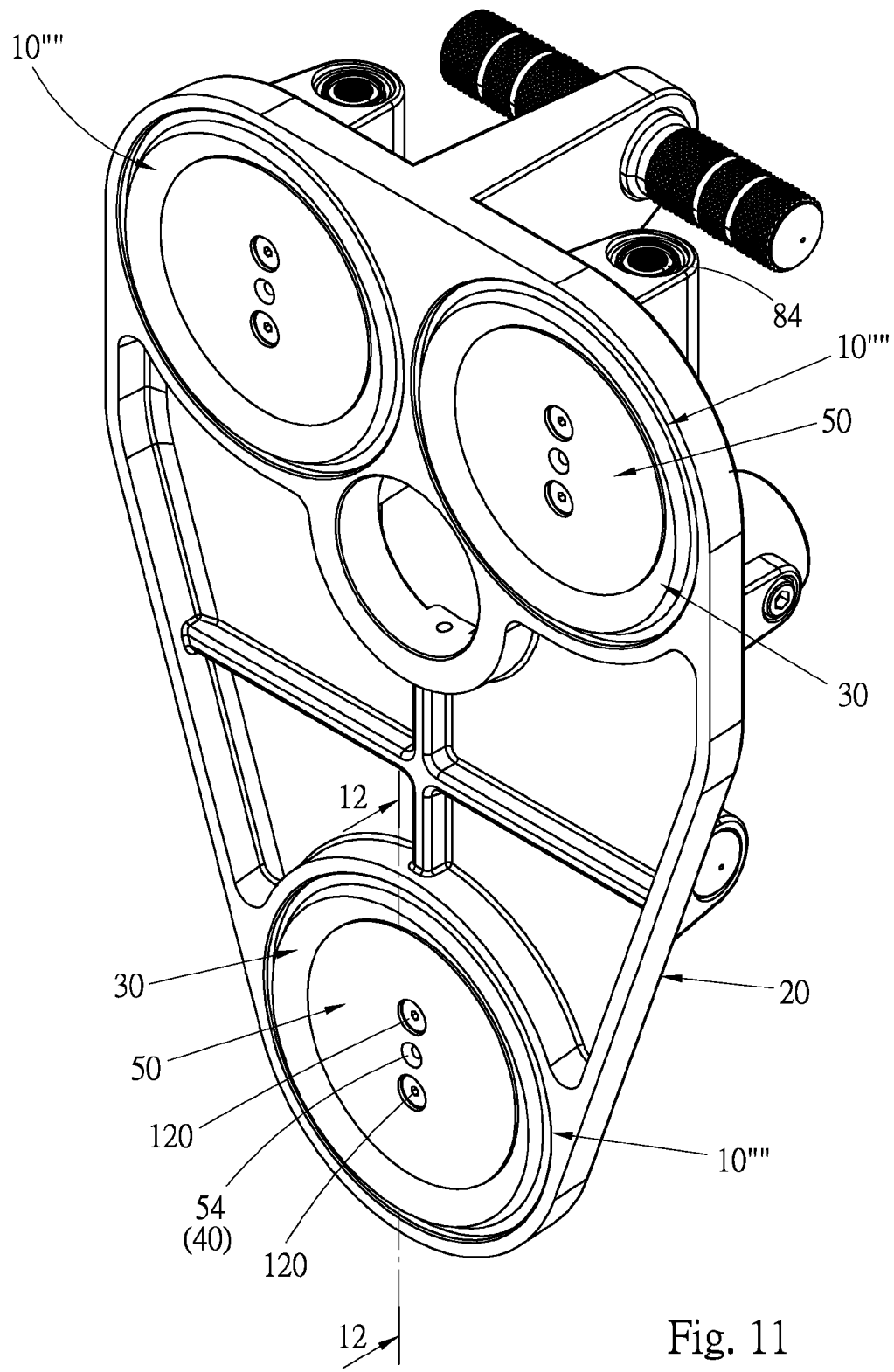
FIG. 11 is a bottom perspective view of a fifth embodiment of the sucker of the present invention.
Figure 12:
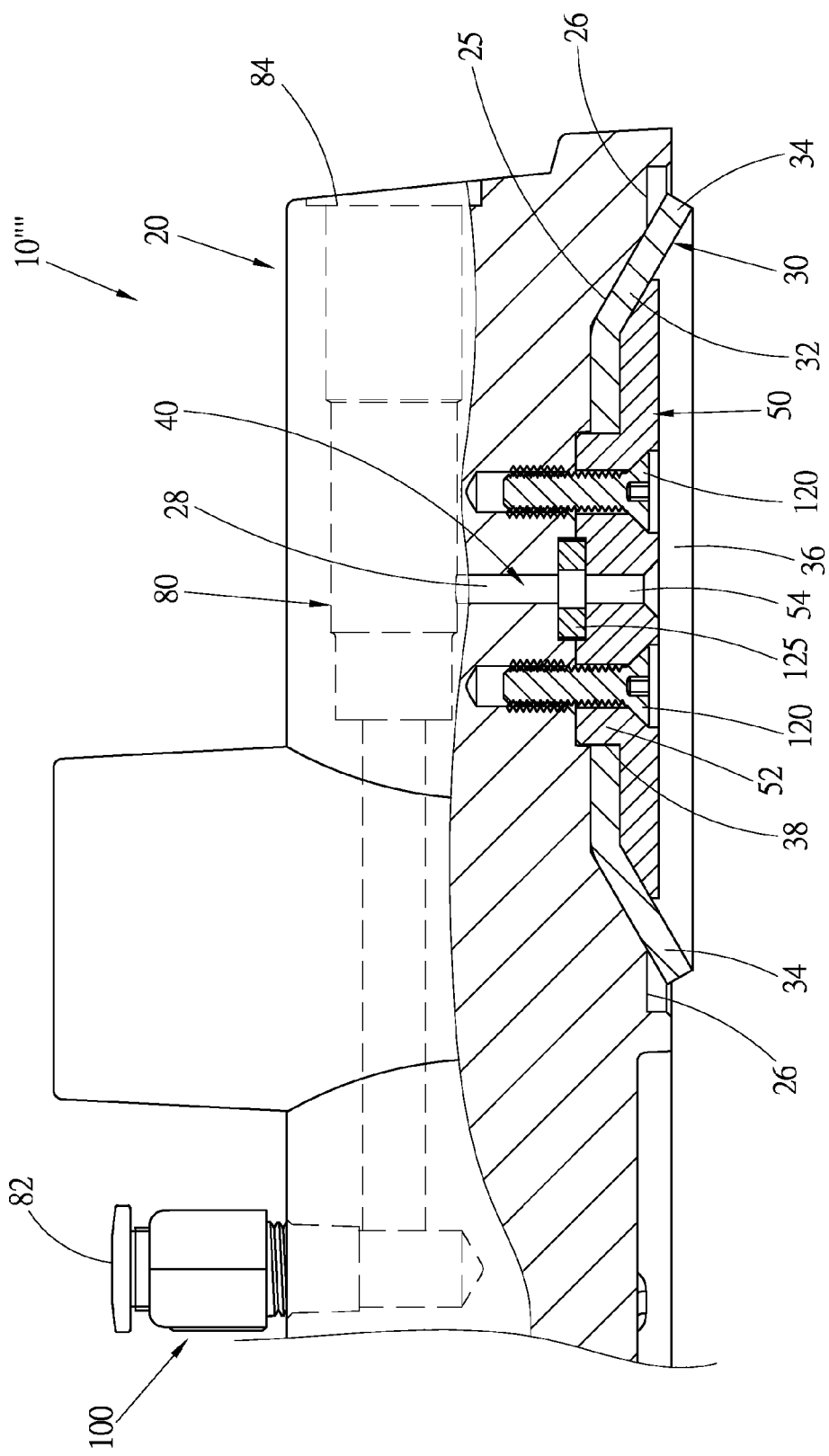
FIG. 12 is a partially sectional view taken along line 12-12 of FIG. 11.

FIGS. 11 and 12 show a fifth embodiment of the sucker 10'''' of the present invention. As shown in the drawings, three suckers 10'''' are mounted on a base seat A of a mechanical apparatus (not shown). The three suckers 10'''' commonly use a main body 20. The structure of the suckers is as shown in FIG. 12. The same components of this embodiment as the aforesaid embodiments are denoted with the same reference numerals.

A tapered room 25 and an annular abutment face 26 are formed on a section of the main body 20 where each disc body 30 is mounted. A passage 28 is formed through the main body 20. A first end (a bottom end) of the passage 28 communicates with the room 25. The disc body 30 is mounted in the room 25. The lip edge 34 is positioned under the abutment face 26. Two or more connection members 120 such as threaded members are used to connect the retainer member 50 with the main body 20 to fix the disc body 30 between the retainer member 50 and the main body 20. The retainer member 50 is formed with an internal hole 54. The internal hole 54 passes through the retainer member 50 between the top face and bottom face of the retainer member 50. The top end of the internal hole 54 communicates with the bottom end of the passage 28. The internal hole 54 and the passage 28 together form the air-sucking passage 40. The air-sucking passage 40 is positioned at the centers of the disc body 30 and the room 25. The connection members 120 are arranged around the air-sucking passage 40. A ring-shaped leakproof member 125 is disposed between the passage 28 of the main body 20 and the internal hole 54 of the retainer member 50.

A connection valve 100 connected with an air pipeline and a fast flow way 80 are further disposed on the main body 20 in a position where each sucker is positioned. The connection valve 100 is an air inlet end 82 of the fast flow way 80, while the other end of the fast flow way is an air outlet end 84. The second end, (that is, the top end of the passage 28) of the air-sucking passage 40 communicates with the fast flow way 80. The first end, (that is, the bottom end of the internal hole 54) of the air-sucking passage 40 communicates with the air chamber 36 of the disc body 30.

When air quickly flows through the fast flow way 80, the suckers 10"" create sucking force to suck the surface of an object. The bottom face of the lip edge 34 of the disc body 30 is snugly attached to the surface of the object and the top face of the lip edge 34 is supported by the abutment face 26.

In conclusion, the sucker of the present invention has better sucking effect and is able to bear higher load than the conventional sucker. Moreover, the sucker of the present invention is applicable to a non-polished surface to widen the application range of the sucker.

The above embodiments are only used to illustrate the present invention, not intended to limit the scope thereof. Many modifications of the above embodiments can be made without departing from the spirit of the present invention.

What is claimed is:

1. A sucker comprising:
   a main body, a bottom face of the main body being formed with a concaved room; an annular abutment face being disposed on the bottom face of the main body and positioned around the room;
   a disc body made of a flexible material, the disc body having a tapered annular wall, the disc body being disposed under the bottom face of the main body, an outer circumference of the annular wall being outward downward inclined to form a lip edge, which is freely flexible, the lip edge being positioned below the annular abutment face of the main body, an angle being contained between the lip edge and the abutment face; an air chamber being formed in the disc body and defined by the annular wall of the disc body;
   an air-sucking passage positioned in the main body and the disc body, the air-sucking passage having a first end and a second end, the first end of the air-sucking passage communicating with the air chamber of the disc body, the second end of the air-sucking passage passing through the disc body and the room of the main body to communicate with outer side; and
   an air flow channel, the second end of the air-sucking passage communicating with the air flow channel; when air flows through the air flow channel, the air in the air flow channel will not enter the air-sucking passage and the air in the air chamber is sucked into the air flow channel.

2. The sucker as claimed in claim 1, wherein the annular abutment face is a horizontal plane face.

3. The sucker as claimed in claim 2, wherein, the disc body is moveable between a normal position and a deformed position, when a suction is applied to the sucker, the disc body is located in the deformed position and a top of the lip edge of the disc body engaging the annular abutment face, and when the suction is removed from the sucker, the disc body is located in the normal position, and the angle contained between the lip edge and the annular abutment face ranges from 20 degrees to 35 degrees.

4. The sucker as claimed in claim 1, wherein the annular abutment face of the main body is further formed with an annular groove, the annular abutment face is formed with an inner annular support face and an outer annular support face.

5. The sucker as claimed in claim 1, wherein, the disc body is moveable between a normal position and a deformed position, when a suction is applied to the sucker, the disc body is located in the deformed position and a top of the lip edge of the disc body engaging the annular abutment face, and when the suction is removed from the sucker, the disc body is located in the normal position, and the angle contained between the lip edge and the annular abutment face ranges from 20 degrees to 35 degrees.

6. The sucker as claimed in claim 1, further comprising a retainer member disposed under the disc body; the disc body is fixedly clamped between the main body and the retainer member.

7. The sucker as claimed in claim 6, wherein at least one radial channel being formed on the bottom face of the retainer member in communication with the first end of the air-sucking passage.

8. The sucker as claimed in claim 6, wherein the air flow channel is disposed in the main body and has an air inlet end and an air outlet end.

9. The sucker as claimed in claim 6, further comprising a support connected with a top end of the main body, the air flow channel being disposed in the support, the air flow channel having an air inlet end and an air outlet end, the second end of the air-sucking passage being positioned in the support in communication with the air flow channel.

10. The sucker as claimed in claim 1, further comprising a retainer member, a support and a hollow connection rod, the retainer member being positioned under the disc body; the support being disposed on a top face of the main body, an airflow passage being formed in the support; the connection rod having an internal passageway, the connection rod passing through the disc body and the main body; two ends of the connection rod being respectively connected with the retainer member and the support; one end of the passageway communicating with the air chamber, the other end of the passageway communicating with one end of the airflow passage of the support, the passageway and the airflow passage together forming the air-sucking passage.

11. The sucker as claimed in claim 10, wherein at least one radial channel being formed on the bottom face of the retainer member in communication with the first end of the air-sucking passage.

12. The sucker as claimed in claim 10, further comprising a valve member disposed on one side of the support, the air flow channel being disposed in the valve member, the air flow channel having an air inlet end and an air outlet end, the second end of the air-sucking passage being in communication with the air flow channel and positioned between the air inlet end and the air outlet end of the air flow channel.

13. The sucker as claimed in claim 1, wherein the air flow channel is disposed in the main body and has an air inlet end and an air outlet end.

14. The sucker as claimed in claim 1, further comprising a support connected with a top end of the main body, the air flow channel being disposed in the support, the air flow channel having an air inlet end and an air outlet end, the second end of the air-sucking passage being positioned in the support in communication with the air flow channel.

* * * * *